United States Patent Office 3,318,712
Patented May 9, 1967

3,318,712
PROCESS FOR RECONSTITUTING MOLDING SAND FOR FOUNDING OPERATIONS
Lothar Robert Zifferer, R.D. 3, Glen Rock, Pa. 17327
No Drawing. Filed Aug. 27, 1964, Ser. No. 392,602
10 Claims. (Cl. 106—38.3)

This invention relates to a process for the reconstitution of the silicate bond on mold and core sands used in founding operations to produce castings.

Historically, the foundry industry has from its early beginning used clay and water to bond refractory sand grains into a semi-plastic heat resistant aggregate. The aggregate so prepared is shaped into forms known as cores and molds. The pouring of molten metal into these molds produces castings. Over 90% of the castings produced today are made by this method.

In the 1950's a method of bonding sand by means of silicate solutions gained increasing acceptance in foundry practice. Essentially, the method entails coating the sand grains with a sodium silicate solution together with other proprietary materials beneficial to the mix. The silicate is then converted to a gel-type bond by the introduction of an acidic gas, such as $CO_2$, into a core or mold form. By a chemical reaction, the gas serves to increase the viscosity of the fluid silicate to such an extent that it functions as an adhesive between adjacent grains of sand. Cores and molds treated in this manner acquire a rigidity which facilitates handling in the successive operations required to produce a finished casting.

The advantages of silicate bonded molds over clay bonded molds are widely discussed in papers and articles to be found in the trade journals. These advantages include:

(1) A reduction of about 30% in the amount of molding sand required to produce a given casting.

(2) The silicate molds generate less gas when contacted with molten metal than do clay bonded sands. Additionally they are more permeable and void the gases that are generated by the molten metal more readily than do clay bonded molds. These characteristics of silicate molds account for a substantial reduction of surface defects such as poor finish, porosity of internal and external types, and the like.

(3) Castings produced in silicate bonded molds are dimensionally more accurate than those made in clay bonded molds.

(4) Silicate bonded molds generally will reduce the percentage of scrap castings which result, largely from the non-uniformity of clay bonded molds.

While the advantages of silicate bonded molds have been recognized for many years, the cost of the required materials has been so high that the use of this method has been restricted to highly automatic operations in which labor savings offset the high material costs or in those circumstances where the quality of the casting to be produced justified a larger expenditure for materials.

The gassing operation which makes the silicate bonded molds rigid renders the sand unsuitable for re-use unless it is processed through sand reclamation machinery available for this purpose. The high cost of reclamation when added to the high cost of new silicate to replace silicate removed in the reclamation stage has further restricted the use of silicate bonded molds.

The process hereinafter described, which comprises the present invention, eliminates the need to reclaim the sand by any separate process or special machinery but, rather, reconstitutes all of the binder left on the sand.

The conventional operations required to make the mold, pour metal therein and separate the casting from the mold are well known and do not materially affect the process of reconstituting the silicate bond on the molding sand. The preferred steps which comprise the process for reconstituting the silicate bonded sand in accordance with this invention are as follows:

Starting from the operation required to separate the casting from the sand mold, the shakeout machine effectively reduces the rigid sand mold into separate lumps or particles of sand small enough to pass through the openings on the deck of a shakeout machine. From the shakeout machine, the silicate bonded sand in the form of small lumps may either be fed directly into a muller to be reconstituted or it can be made to pass through a conventional crusher to further reduce the lumps and then the latter are passed into a muller.

By the time the sand reaches the muller, it has been reduced to a size such that the lumps therein preferentially do not exceed one inch in size. After the sand has been introduced into the muller or other mixing device, there is added thereto a predetermined quantity of a solution of suitable alkali such as sodium or potassium hydroxide. The mixing action which ensues thoroughly distributes the alkali throughout the sand being mixed. The function of the alkali is to lower the viscosity of the silicate bond on the sand to such an extent that the lumps are progressively readily reduced to grain size. The individual grains of sand become coated with the alkali, and said alkali coating enters into a reaction with the layer or coating of high viscosity silicate bond material directly on the sand grains beneath the alkali. By adjusting the water content of the alkali solution, sufficient water can be introduced into the mix to replace the water lost through evaporation in the casting process. The addition of predetermined quantities of alkali and water to the silicate coated sand completely restores the bonding properties of the previously spent silicate.

The cyclic re-use of sand for molds in a foundry operation results in a loss of a small quantity of the sand due to a fused layer which clings to the internal and external surfaces of the casting. This process loss is sometimes replaced by core sand. When insufficient core sand is available to make up the loss per cycle, it becomes necessary to add new sand to the system. New sand additions, however, will require the use of a sufficient quantity of new silicate binder. The new, replacement sand may be added at the same time as the used sand is introduced into the muller so as to become thoroughly mixed therewith. After the addition of NaOH and water to the mixture and the appropriate mixing of these ingredients for a predetermined time, new make-up silicate should be added and mixed for an additional time. While the order in which these operations are performed may be changed and still produce satisfactory results, the order described is to be preferred. A description of the chemistry controlling these events is as follows:

Sodium silicate is essentially a water soluble glass and is commercially available in liquid form in various types characterized by the $SiO_2$ to $Na_2O$ ratio which may vary from 1.6:1 in the alkaline grades to 3.3:1 in more neutral grades. The various grades of commercial silicates can be obtained with a water content adjusted to the requirements of the user.

When sand is mixed with sodium silicate and subsequently gassed with $CO_2$ the viscosity of the silicate is enormously increased by the chemical reaction which takes place. The increased viscosity of the silicate is responsible for the bonding action which effectively solidifies the sand mold form.

The increase in viscosity of the silicate to form a bond is due to the change in the ratio of $SiO_2$ to $Na_2O$ occasioned by the introduction of $CO_2$ gas. This reaction is exemplified by the following equation in which the gas acts as an acid:

$$a(SiO_2) \cdot b(Na_2O) \cdot c(H_2O) + d(CO_2) \longleftrightarrow$$
$$a(SiO_2) \cdot (b-d)(Na_2O) \cdot c(H_2O) + d(Na_2CO_3)$$

The reaction of the $CO_2$ gas with the $Na_2O$ in the silicate has changed the ratio of $SiO_2$ to $Na_2O$ from $a/b$ to a higher ratio of $a/b-d$.

Because high ratio silicates require more water than low ratio silicates to provide a given viscosity, the action of the $CO_2$ gas which changes the ratio of the silicate from $a/b$ to the higher ratio $$\frac{a}{b-d}$$

brings about an enormous increase in the viscosity due to a water deficiency brought about by the high ratio of the reacted silicate. The high viscosity, high ratio silicate which is the product of the reaction provides the bond between adjacent sand grains.

In practice, this reaction is carried out with an excess of $CO_2$ gas, and the ratio of $SiO_2$ to $Na_2O$ will be changed from approximately 2:1 to about 4:1. When a silicate reaches a 4:1 ratio of $SiO_2$ to $Na_2O$, it becomes a relatively water insoluble gel. A characteristic of sodium silicates is that they become progressively more water soluble as the ratio of $SiO_2$ to $Na_2O$ is lowered.

Referring to the equation in which $CO_2$ gas is used to form $Na_2CO_3$ and raise the ratio of the silicate from $a/b$ to $$\frac{a}{b-d}$$

if an amount $(d)$ of $Na_2O$ is added to the high ratio gel in the form of NaOH, it is possible to re-establish the $a/b$ ratio, dissolve the high ratio gel, and restore the silicate to the viscosity which it had before gassing. By adjusting the water content of the NaOH, sufficient water is added to the sand to replace the loss by evaporation which takes place when metal is poured into a silicate mold. In this manner, a simple and economical method is provided for reconstituting all of the silicate bond used in a recycling molding process. The foregoing reaction is reversible to any end point desired, within reasonable limits, by changing the pH of the reacting body by the addition of variable amounts of alkali.

The ratio of the reconstituted binder may be selected to suit the needs of the foundry. The reconstituted $SiO_2$ to $Na_2O$ ratio will normally vary from 1.8 to 2.6. The lower ratio will provide extended bench life before drying out and is particularly well suited to operations which require sand to be blown into the mold box or flask. The higher ratio binders will require less $CO_2$ and gas more rapidly than the low ratio binders but will have less bench life and be less suited for use with automatic molding equipment.

It has been established that the $Na_2CO_3$ by-product in the foregoing reaction is precipitated as a separate and distinct phase from the sodium silicate solution, and that increasing quantities of $Na_2CO_3$ in a sand mix will have no effect on the bonding strength of the reconstituted silicate solution. A progressive buildup of $Na_2CO_3$ can change certain properties of the sand mix such as flowability, green strength, permeability, and sintering point. The $Na_2CO_3$ in the sand mix can, however, be selectively controlled to any desired concentration level to suit the conditions and practices of a given foundry. The buildup of a mechanically admixed quantity of $Na_2CO_3$ in the sand mix may be permitted to proceed to a limit dependent on the amount of new sand used to replace lost sand as it is cyclically re-used in a system.

An expression for this limit as the sum of a simple geometric series is useful in predicting the upper limit concentration of $Na_2CO_3$ as a weight percentage of the sand mixture, and is as follows:

Assuming
S is the percentage limit of $Na_2CO_3$ in the sand mix,
$r$ is the decimal portion of used sand being reconstituted, and
A is the percentage of $Na_2CO_3$ formed in a single cycle (approx. 0.6%), then the expression for the limiting percentage S becomes:

$$S = A\left(\frac{1}{1-r} - 1\right)$$

However, when using 90% used sand and 10% new sand, $$S = 0.6\%\left(\frac{1}{1-.85} - 1\right) \text{ or } 3.4\%$$

The $Na_2CO_3$ will not exceed a limit figure of 3.4% of the sand mix as the sand is continuously recycled.

When a quantity of $Na_2CO_3$, which is deemed excessive, accumulates in the sand mix, the $Na_2CO_3$ and silicate can be removed by treating the sand with a dilute solution of NaOH. The sand, after drying, can be introduced as new sand into the system, at the muller or mixer, together with a suitable quantity of new silicate. Alternatively, however, the following method of controlling the $Na_2CO_3$ level can be used. The sand from the shakeout unit is reduced to grain size in a type of crusher commercially available for this purpose, and a portion of the powdered $Na_2CO_3$ is removed from the sand by passing air through the mass as it is being agitated, or the sand reduced to grain size can be air-conveyed to a classifier where a portion of the $Na_2CO_3$ is removed from the used sand. In either technique, the sand is returned to the muller or mixer where the silicate is reconstituted in the manner previously described.

The use of sodium or potassium silicates as binders and/or the oxides of sodium or potassium in a water solution to reconstitute the bond on the sand are envisioned in the foregoing process. Also, the specific exemplary equations illustrating the chemistry of the reaction are by way of example and are equally applicable if potassium is substituted in whole or part for the sodium of the silicate or for the $Na_2O$ used to reconstitute the binder.

It then will be seen that the sand coated with reconstituted binder may be reclaimed from molds and/or cores and be reconstituted for re-use to produce molds and/or cores.

I claim:
1. A process for reconstituting high viscosity silicate bonded sand used for sand molds comprising the steps of feeding used, high viscosity silicate bonded sand aggregate into a muller, adding thereto a predetermined quantity of caustic soda reagent and water, and mixing the aggregate and the reagent material for sufficient time to lower the viscosity thereof sufficiently to reconstitute the bonding properties of the silicate coating to render the same suitable for reuse to form silicate bonded sand molds through the addition of $CO_2$ to increase the bonding characteristics of the sand.

2. The process according to claim 1 in which new sand and new silicate binder required for bonding the new sand is added to the mix in any desired order as make-up for sand losses in molding.

3. The process according to claim 1 in which used silicate bonded sand is washed in dilute caustic soda and dried and is provided with sufficient new silicate material to render it suitable for bonding and then is added as make-up sand to reconstituted sand aggregate.

4. The process according to claim 1 in which the addition of $CO_2$ to the silicate bonded sand during the molding process produces $Na_2CO_3$, said process including the further steps of removing a substantial portion of the silicate bonded sand aggregate from the mass to be reconstituted, washing said removed portion with a dilute solution of NaOH to reduce the $Na_2CO_3$ content to an acceptable level, introducing said treated sand aggregate while undried into the mixer in which the remainder of the mass of said aggregate is being reconstituted, and adding to the mixture sufficient new silicate binder to replace that which was lost by the removed and washed portion of said aggregate.

5. The process according to claim 1 in which the water is added in amounts necessary to replace losses in the molding operations.

6. The process according to claim 1 in which the addition of $CO_2$ during the molding process produces $Na_2CO_3$ in the used sand and reducing such content of $Na_2CO_3$ in the used sand prior to the introduction of said used sand into the muller for the purpose of reconstituting the binder.

7. The process according to claim 6 in which the $Na_2CO_3$ content of the used sand is reduced by treating the same with a dilute solution of NaOH.

8. The process of reconstituting used silicate bonded sand for use to form additional sand molds by controlling the $Na_2CO_3$ concentration in the same comprising the steps of continuously removing a portion of the used sand being reconstituted from the mass thereof, treating the removed portion of sand with dilute caustic soda, reintroducing the sand so-treated into the sand mixture for forming new molds, adding sufficient new sand to make up for said losses during molding operations, and adding a predetermined quantity of new silicate binder necessary to both replace losses thereof from treatment of said removed portion of sand and provide said new sand with said binder.

9. The process of reconstituting used silicate bonded sand for use to form additional sand molds by controlling the $Na_2CO_3$ concentration in the same caused by treating the silicate bonded sand with $CO_2$ comprising the steps of continuously removing a portion of the $Na_2CO_3$ from all the used sand being reconstituted by reducing the used sand substantially to grain size by a crushing operation, passing a gaseous current through the mass while being crushed to entrain a desired amount of said $Na_2CO_3$ and physically remove the same from the mass, and adding a solution of NaOH to said treated sand mass in sufficient quantity to restore it to bondable condition when formed into a mold.

10. The process according to claim 9 which includes further the addition of new sand to the treated sand mass to restore losses during molding operations, also adding new silicate binder to the treated sand mass and added sand to provide adequate binder for the entire mass, and thoroughly mixing said additions with said treated sand mass.

References Cited by the Examiner

UNITED STATES PATENTS 2,987,789   6/1961   Moren _____ 22—192

J. SPENCER OVERHOLSER, *Primary Examiner.*

V. K. RISING, *Assistant Examiner.*